(12) United States Patent
Dantlgraber

(10) Patent No.: US 7,704,068 B2
(45) Date of Patent: Apr. 27, 2010

(54) DRIVE UNIT

(75) Inventor: Joerg Dantlgraber, Lohr (DE)

(73) Assignee: Bosch Rexroth AG, Stuttgart (DE)

( * ) Notice: Subject to any disclaimer, the term of this patent is extended or adjusted under 35 U.S.C. 154(b) by 404 days.

(21) Appl. No.: 11/571,724

(22) PCT Filed: Jul. 1, 2005

(86) PCT No.: PCT/EP2005/007106

§ 371 (c)(1),
(2), (4) Date: Jul. 2, 2007

(87) PCT Pub. No.: WO2006/005452

PCT Pub. Date: Jan. 19, 2006

(65) Prior Publication Data

US 2007/0269552 A1 Nov. 22, 2007

(30) Foreign Application Priority Data

Jul. 8, 2004 (DE) .................. 10 2004 033 121

(51) Int. Cl.
*B29C 45/17* (2006.01)
(52) U.S. Cl. .................. 425/542; 425/556; 425/574; 425/589; 60/545; 60/565

(58) Field of Classification Search .................. 425/542, 425/556, 574, 589; 60/545, 565
See application file for complete search history.

(56) References Cited

U.S. PATENT DOCUMENTS

| 5,345,766 | A  * | 9/1994 | Leonhartsberger et al. .... 60/545 |
| 6,439,875 | B1   | 8/2002 | Morita et al. |
| 6,935,111 | B2 * | 8/2005 | Dantlgraber .................. 60/565 |
| 7,351,053 | B2 * | 4/2008 | Dantlgraber ................ 425/542 |

FOREIGN PATENT DOCUMENTS

DE        101 21 024 A1    11/2001

* cited by examiner

*Primary Examiner*—James Mackey
(74) *Attorney, Agent, or Firm*—Boyle Fredrickson, S.C.

(57) ABSTRACT

Disclosed is a drive unit, in particular for a closing unit, an injection unit, or an ejector of an injection molding machine. The drive unit comprises a double-acting force transmitting element provided with a small and a large piston unit which are disposed in a cylinder. The large piston unit is adapted to be pressurized by a great force both in input and in output directions. According to the invention, both the large piston unit with respect to the cylinder and the cylinder with respect to a movable element of the drive of the small piston unit are spring-prestressed.

14 Claims, 1 Drawing Sheet

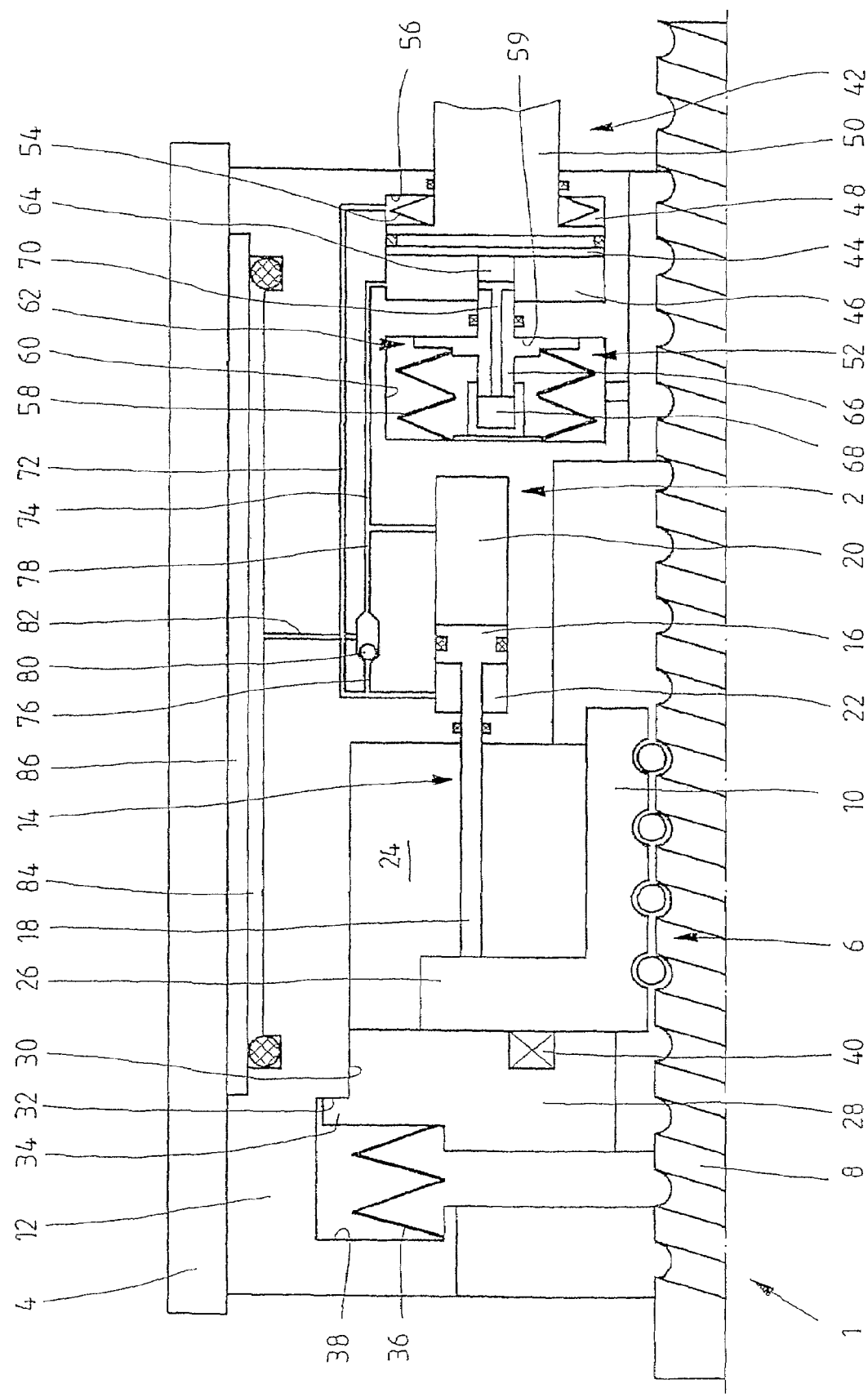

DRIVE UNIT

BACKGROUND OF THE INVENTION

1. Field of the Invention

The invention relates to a drive unit, in particular for an injection unit or an ejector of an injection molding machine.

2. Description of Related Art

Recently, one has provided injection molding machines with electric and hydraulic drives, wherein actuations at high speed are exerted by the electric drive with relatively low forces, while the hydraulic drive is particularly advantageous if high axial forces have to be applied with comparatively minor actuations.

In the case of a closing unit of a plastics injection molding machine, for instance, the drive unit moves a movable tool faceplate of the machine. In so doing, the drive unit has to fulfill two important, different objects. On the one hand, it is to move the tool faceplate as quickly as possible for closing and for opening the mould so as to keep the cycle time of the manufacturing of an injection-molded component as short as possible. On the other hand, it is to impact the tool faceplate with a high clamping force, so that the tool can be kept shut against the high inner pressure during injection molding. The drive unit therefore has to be configured such that it is adapted to perform actuations at high speed and to apply high forces with a comparatively minor stroke. Requirements of this kind are posed, except with a closing unit, also with the actuation of ejectors or the injection unit of an injection molding machine.

DE 101 21 024 A1 (cf. in particular FIGS. 26, 34) of the Applicant discloses a drive unit that is adapted to fulfill the afore-mentioned requirements. This drive unit comprises a hydraulic force transmitting element, the smaller piston unit of which is actuated via an electrically actuated stroke spindle device for closing a tool. This smaller piston unit may consist of one single smaller piston, or of a plurality of small pistons. These confine, along with a cylinder or interface and one or several large pistons of the force transmitting element, a pressure chamber, wherein, by the moving of the small piston unit into the pressure chamber, a high pressure can be generated, which acts, via the large active surface of the large pistons (power pistons) on the movable tool faceplate which may then be kept shut with high force. During the quick closing of the tool with comparatively low force, the interface is indirectly connected with a spindle nut of the spindle device, so that the piston unit with smaller diameter, the power piston, and the interface are jointly shifted by the spindle device. For applying the high force, the interface is fixed at the frame of the injection molding machine, so that the further closing movement of the tool is determined by the moving of the smaller piston unit into the pressure chamber and the corresponding axial movement of the large piston of the force transmitting element.

In one embodiment described in DE 101 21 024 A1 (FIG. 34), the coupling of the cylinder to the stroke spindle device is performed hydraulically. To this end, a chamber confined by a section of the small piston unit and the cylinder is impacted with pressure from a high pressure storage means, so that the pressure medium incorporated in the chamber acts like rigid pulling mechanics and the cylinder participates in the closing stroke of the stroke spindle device and thus of the small piston unit.

In an embodiment illustrated in FIG. 26 of DE 101 21 024 A1, the small piston unit is, during rapid motion, connected with the large piston via an electromagnetic coupling. This large piston is in turn centered with respect to the cylinder by a prestressed centering spring arrangement. The prestressing of this centering spring arrangement is chosen such that the axial shifting of the small piston unit is, during rapid motion, transferred to the large piston via the coupling, and from there via the centering spring arrangement to the cylinder so as to take it along.

In both known solutions the force transmitting element is designed to be double-acting, so that, for tearing open the tool, a high tear-open force acts on the tool via the force transmitting element as the small piston unit moves in opening direction. This movement of the small piston unit in opening direction is performed during the application of the tear-open force against the force of a prestressed pressure spring.

A disadvantage of the initially mentioned known construction (FIG. 34) is that, for applying the high pressure in the chamber during rapid motion, a comparatively complex circuitry with high pressure storage means and electrically controlled direction control valve is required, so that this circuitry variant is very expensive and also requires substantial construction space.

In the solution illustrated in FIG. 26 of DE 101 21 024 A1, the large piston has to be designed with a very large surface due to the integrated coupling, so that a compact solution cannot be realized with such a construction.

SUMMARY OF THE INVENTION

In contrast, it is an object of the invention to provide a compact drive unit of simple construction, in particular for a closing unit, an injection unit, a slider, or an ejector of an injection molding machine.

This object is solved by a drive unit with the features of the claims.

The inventive drive unit comprises a double-acting force transmitting element with a large and a small piston unit, wherein a large force can be exerted on the large piston unit in output direction or in input direction via the force transmitting element. The driving of the small piston unit is preferably performed electrically. The large piston unit is centered with respect to the cylinder of the force transmitting element via a centering spring arrangement. In accordance with the invention, the drive unit comprises a support plate that is adapted to be connected with an axially shiftable portion of the drive and by which the cylinder is supported via a prestressed pressure spring such that the input movement (tearing open) of the drive is transmitted to the cylinder.

In the solution according to the invention, the centering of the large piston unit with respect to the cylinder and of the cylinder with respect to the drive is thus performed via springs, so that the drive unit can be designed much simpler than with the initially-mentioned solution with hydraulic prestressing. These springs between the cylinder and the large piston unit and the cylinder and the drive require very little construction space only, so that the drive unit can be designed compactly and with a short structure.

In accordance with the invention it is preferred if the support plate is prestressed via the pressure spring against an abutment shoulder of the cylinder, so that the output movement of the drive is transmitted to the cylinder via the abutment shoulder. The connection of the support plate with the axially shiftable element of the drive is preferably performed via an electrically actuatable coupling.

In a preferred embodiment of the invention, the drive is performed by a spindle device, wherein a rotation of the spindle is transferred to an axial movement of the spindle nut.

The centering spring arrangement for centering the large piston unit with respect to the cylinder is preferably incorporated in a prestressed manner.

In one embodiment of the invention, the centering spring device comprises, on the one hand, a spring, the prestressing of which has to be overcome for outputting the large piston unit and, on the other hand, a tear-open spring, the prestressing of which has to be overcome during the applying of a tear-open force. The tear-open spring engages a spring cup that is movable against an abutment of the cylinder, and against which the large piston unit is prestressed by the above-mentioned spring. The two front faces of the spring cup are preferably pressure-equalized.

In a particularly preferred embodiment, the spring cup comprises a projection extending from a spring chamber for the tear-open spring into a cylinder chamber accommodating the large piston unit and against which the large piston unit is prestressed. The spring cup moreover comprises a plunger projection immersing sealingly into a pressure chamber in the spring chamber of the tear-open spring, which is connected with the cylinder chamber confined by the large piston unit. This connection is preferably performed by a bore that penetrates the spring cup and that opens, on the one hand, into the pressure space and, on the other hand, into the cylinder chamber.

The small piston unit comprises a piston with a piston collar by which a chamber of the cylinder is divided into a pressure chamber and a rear-side ring chamber that is penetrated by a piston rod of the piston. This piston rod is in operating connection with the drive, preferably with the axially shiftable spindle nut.

In one embodiment of the invention, the ring chamber is, via a tear-open channel, connected with a ring chamber of an accommodating element for the large piston unit, which acts in opening direction. In this ring chamber, the spring of the centering spring arrangement is preferably also accommodated.

The front pressure chamber confined by the piston collar is connected with the cylinder chamber of the accommodating element by means of a pressure channel.

Preferably, the larger one of the pressures in the pressure chamber and in the ring chamber is tapped by a two-way valve and guided to a clamping chamber that is confined by a clamping sleeve. This clamping sleeve is radially deformed with sufficient pressure in the clamping chamber so as to clamp the cylinder with respect to a frame of the machine.

In accordance with the invention, the surface area relationship of the piston of the small piston unit which is designed as a differential piston is equal to the surface area relationship of the large piston unit which is also designed as a differential piston.

Other advantageous further developments of the invention are the subject matters of further subclaims.

BRIEF DESCRIPTION OF THE DRAWINGS

FIG. 1 is a cross-sectional side views of a drive unit according to a preferred embodiment.

DETAILED DESCRIPTION OF THE PREFERRED EMBODIMENT

In the following, a preferred embodiment of the invention will be explained in more detail by means of a single FIGURE. The FIGURE shows a functional diagram of a drive unit 1 of a closing unit of an injection molding machine, wherein, to simplify matters, only the top half of the drive unit 1 is illustrated.

The drive unit 1 for a closing unit comprises a force transmitting element 2 via which, for closing, keeping shut, or feeding of a tool, a tool faceplate (not illustrated) is adapted to be shifted or to be impacted with a keeping-shut or tearing-open force, respectively. The force transmitting element 2 is mounted to be axially shiftable in a frame 4 of the injection molding machine and is actuated by means of an electrically driven spindle device 6.

The spindle device 6 comprises a spindle 8 that is rotatably mounted in the frame 4 and that is in engagement, via a ball rolling thread, with a spindle nut 10 that is mounted torque-proof and is axially shiftable. The drive may, of course, also be designed in kinematic reversion.

The force transmitting element 2 comprises a cylinder 12 which is, for instance, mounted to be axially shiftable on beams of the frame 4 which are not illustrated. The force transmitting element comprises a small piston unit that consists, in the illustrated embodiment, of several pistons 14. Each of the pistons 14 comprises a piston collar 16 and a piston rod 18. The piston collar 16 divides a chamber of the cylinder 12 into a pressure chamber 20 and into a ring chamber 22 that is penetrated by the piston rod 18. The piston rod 18 extends out of the cylinder 12 into a chamber 24 into which the spindle nut 10 immerses with a support flange 26 at which the piston rod 18 is supported or fixed.

The front face of the support flange 26 of the spindle nut 10 which is remote from the piston rod 18 is adapted to be brought in abutment with a support plate 28 that is guided to be axially shiftable in a guiding bore 30 of the cylinder 12. The guiding bore 30 is radially enlarged by a front face 32 at which the support plate 28 abuts with an abutment shoulder 34 in the basic position illustrated. The support plate 28 is prestressed in this position by a pressure spring 36 that is supported by an inner front face 38 of the cylinder 12.

The support plate 28 moreover comprises an electrically actuatable coupling 40 for connection with the support flange 26 of the spindle nut 10. This means that, if the coupling 40 is under current, the support plate 28 is taken along by the spindle nut 10.

The force transmitting element 2 comprises a large piston unit that is formed of several power pistons 42 in the embodiment illustrated. The entire active surface of the power pistons 42 is larger than the entire active surface of the pistons 14, wherein the relationship of the active surfaces determines the transmission ratio of the force transmitting element.

The power pistons 42 are designed as differential pistons and guided in an accommodating element of the cylinder 12. This accommodating element is subdivided, by a power piston collar 44, into a cylinder chamber 6 and a rear-side ring chamber 48 that is penetrated by a power piston rod 50 which engages the movable tool faceplate. The surface relationship of the ring chamber-side ring front face and of the cylinder chamber-side front face of the piston 42 is equal to the surface relationship of the ring front face of the piston collar 16 of the small piston unit to its front face.

The power piston 42 is centered with respect to the cylinder 12 via a centering spring arrangement 52. This centering spring arrangement 52 comprises, on the one hand, a spring 54 arranged in the ring chamber 48 which is supported by an inner face 56 of the cylinder and which engages the ring front face of the piston collar 44. On the other hand, the centering spring arrangement 52 comprises a tear-open spring 58 that is accommodated in a sprig chamber 60 and engages a spring cup 62. This spring cup 62 comprises an axial projection 63 that sealingly penetrates a wall between the spring chamber 60 and the accommodating element for the power piston 42 and abuts at the adjacent front face of the power piston 42 in the basic position (see the FIGURE). Both springs 54, 58 are incorporated with prestressing. The spring cup 62 is prestressed by the tear-open spring 58 against an abutment face 59 in the basic position illustrated, so that the immersion depth of the projection 64 into the cylinder chamber 46 is restricted.

In the opposite direction to the projection 64 there extends a plunger projection 66 into a pressure medium chamber 68 of the spring chamber 60. It is connected with the cylinder chamber 46 via a bore 70 of the spring cup 62, so that the two front faces of the projections 66, 64 which are of equal size are pressure-equalized. In accordance with the FIGURE, the spring chamber is ventilated outward, so that no pressure can build up in it.

In the illustrated embodiment, the ring chamber 22 is, via a tear-open channel 72, connected with the ring chamber 48, and the pressure chamber 20, via a pressure channel 74, with the cylinder chamber 46. The pressures in the tear-open channel 72 and the pressure channel 74 are guided, via two tapping channels 76, 78, to the inputs of a two-way valve 80, the output of which is connected with a clamping chamber 84 via an output channel 82. The clamping chamber 84 is confined outward by a clamping sleeve 86 that bulges radially outward when the clamping chamber 84 is pressurized, and is then held in place by friction at the frame 4, e.g. at beams or the like.

Instead of the hydraulic two-way valve 80 described, the valve may also be designed to be electrically adjusted. The clamping sleeve 86 may, of course, also be arranged such that it is deformed radially inward for clamping. As indicated, instead of the plurality of small pistons 14 and large power pistons 42, one single small piston and one single large power piston each may also be used.

For closing the tool, the movable tool faceplate is first of all fed in rapid motion. To this end, the spindle 8 is driven electrically, so that its rotational movement is transferred to an axial forward movement via the spindle nut 10. During rapid motion the coupling 40 is under current, so that the support plate 28 is taken along by the spindle nut 10. By the abutment of the abutment shoulder 34 at the front face 32, the cylinder 12 is correspondingly also shifted in axial direction. The power pistons 42 are centered with respect to the cylinder 12 via the centering spring arrangements 52 that are respectively assigned to the power pistons 42, so that the power pistons 42 are moved along with the cylinder 12 quasi as a unit.

After the closing of the mould, the coupling 40 is disconnected from current and thus opened, so that the support plate 28 stops while the spindle nut 10 is moved further to the right. By this axial movement of the spindle nut 10, the pressure chamber 20 is reduced by the piston collar 16, so that the pressure therein and in the cylinder chambers 46 that are connected with the pressure chamber 20 via the pressure channels 24 increases. The ring chamber 22 is enlarged by the axial shifting of the piston collar 16, so that the pressure therein and in the ring chambers 48 that are connected via the tear-open channels 72 is correspondingly lower. The two-way valve 80 is shifted to the illustrated position in which the pressure chamber 20 is, via the output channel 82, connected with the clamping chamber 84—the clamping sleeve 86 is deformed radially and abuts at the guiding face of the frame 4, so that the cylinder 12 is clamped with respect to the frame 4. Until this clamping occurs, the spring 54 cares, with the tool fed, that the cylinder 12 cannot evade to the left. By the further movement of the spindle nut 10 and thus of the piston 44, the pressure in the pressure chamber 20 and thus also in the cylinder chamber 46 is increased, so that the power piston 42 acts, corresponding to the surface relationship between the small and the large piston units, on the tool faceplate with high force and keeps it shut. This keeping-shut force is, however, only built up if the applied closing force is larger than the prestressing of the spring 54. On applying of the closing force, the tear-open piston 42 is lifted from the projection 64 and is shifted to the right in the FIGURE against the force of the spring 54.

After the injection of the molded component mass and after the post pressure phase, the closing force is first of all relieved for opening the tool. To this end, the drive of the spindle 8 is triggered in reverse direction, so that the spindle rotates backward and the spindle nut 10 is moved from its closing position (lifted off the support plate 28) to the left until it contacts the support plate 28.

During this relieve of the closing force, the cylinder 12 is initially still clamped, so that the pressure chamber 20 is enlarged and the ring chamber 22 is reduced by the movement of the piston 14 to the left. Correspondingly, the pressure in the cylinder chamber 46 decreases while the pressure in the ring chamber 48 increases, so that the power piston 42 is shifted from its keeping-shut position to the left until it contacts the prestressed projection 64. The closing force is then largely relieved and the clamping is released. For applying a tear-open force acting to the left, the spindle 1 is continued to be triggered backward, so that the spindle nut 10 moves from the illustrated basic position further to the left. As the spindle nut 10 moves further to the left, the support plate 28 is lifted with its abutment shoulder 34 off the front face 32 of the cylinder 12 against the force of the pressure spring 36 and moved to the left. The smaller piston(s) 14 perform(s) a corresponding stroke, so that the volume of the ring chamber 22 is reduced and, correspondingly, the volume of the pressure chamber 20 is increased. This means that a pressure is built up in the ring chamber 22 and in the ring chamber 48 connected therewith, whereas the pressure in the pressure chamber 20 and in the cylinder chamber 46 connected therewith is comparatively low. By that, the two-way valve 80 is switched from the illustrated position, so that the clamping chamber 84 is now connected with the ring chamber 22—the cylinder 12 is again clamped during the tear-open process. Until this clamping occurs, the cylinder 12 is prevented by the tear-open spring 58 from evading to the right, so that the clamping pressure can be built up in the way described before. Thus, a tear-open force acting on the power piston 42 to the left is built up, which results from the product of the pressure in the ring chamber 48 multiplied with the sum of the ring front faces of the power pistons 42 minus the force of the tear-open spring(s) 58. This tear-open force is, however, only built up if the force acting on the power piston 42 is larger than the prestressing of the tear-open spring 58.

Subsequently, the power piston 42 is moved to the left against the force of the tear-open spring 58, so that the spring cup 62 is taken along and immerses deeper into the pressure chamber 68 with its plunger projection 66. This tear-open force is built up until the tool is torn open very quickly. After this tearing open, the pressure in the clamping chamber 84 drops, so that the cylinder 12 is shifted to the left by the force of the compressed pressure spring. Consequently, the pressure chamber 20 is reduced and the ring chamber 22 is enlarged. Simultaneously, the power piston 42 is, due to the decreasing pressure in the ring chamber 48, shifted to the right by the force of the tear-open spring 58 until it assumes its basic position as illustrated, in which it is prestressed by the spring 54 and the tear-open spring 58—i.e. after the tearing open of the tool, the tear-open pistons 42 center with respect to the cylinder 12, and the pressures in the clamping chamber 84, in the pressure chamber 20, and in the ring chamber drop to the initial values. Subsequently, the movable tool faceplate is fed in rapid motion, with the axial movement of the spindle nut 10 being transferred to the cylinder 12 via the prestressed pressure spring 36. The closing unit of the injection molding machine is ready for the next cycle.

Disclosed is a drive unit, in particular for a closing unit, an injection unit, a slider, or an ejector of an injection molding machine. The drive unit comprises a double-acting force transmitting element provided with a small and a large piston unit which are disposed in a cylinder. The large piston unit is adapted to be pressurized by a great force both in input and in output directions. According to the invention, both the large piston unit with respect to the cylinder and the cylinder with respect to a movable element of the drive of the small piston unit are spring-prestressed.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

The invention claimed is:

1. A drive unit comprising a double-acting hydraulic force transmitting element comprising two piston units, each including at least one piston, movable relative to each other with different sized active surfaces smaller and larger respectively, which confine, along with a cylinder, pressure chambers, wherein the smaller piston unit is driven electrically with an electric drive, and the cylinder, for applying an axial force, is adapted to be fixed via a hydraulically actuated clamping means with respect to a frame of the machine, and a centering spring arrangement for centering the larger piston unit with respect to the cylinder, and a prestressed pressure spring via which the cylinder is supported by a movable element of the drive unit.

2. The drive unit according to claim 1, wherein said pressure spring is supported by a support plate which in turn comprises a coupling for connection with the movable element of the drive unit and which is, via said pressure spring, prestressed with an abutment shoulder against a front face of said cylinder.

3. The drive unit according to claim 1, wherein the electric drive is a spindle device with a spindle nut and a spindle.

4. The drive unit according to claim 1, wherein said centering spring arrangement is prestressed.

5. The drive unit according to claim 4, wherein a power piston of the larger piston unit is pressurized in opening direction via a prestressed spring and in closing direction via a prestressed tear-open spring which is supported by a spring cup that is adapted to be moved toward an abutment and which said power piston can abut to.

6. The drive unit according to claim 5, wherein said spring cup comprises a projection for abutment at said power piston and a rear plunger projection extending into a spring chamber for said tear-open spring, said plunger projection immersing into a pressure medium chamber that is in turn connected with a cylinder chamber confined by said power piston.

7. The drive unit according to claim 6, wherein said spring cup is penetrated by a bore that opens, on the one hand, into said pressure medium chamber and, on the other hand, into said cylinder chamber.

8. The drive unit according to claim 1, wherein said smaller piston unit comprises a piston collar dividing a chamber of said cylinder into a pressure chamber and a rear-side ring chamber that is penetrated by a piston rod of said smaller piston unit, which is in turn in operating connection with the movable element of said drive unit.

9. The drive unit according to claim 8, wherein said ring chamber is, via a tear-open channel, connected with a ring chamber of an accommodating element for a power piston of the larger piston unit which is effective in opening direction, wherein the spring is accommodated in said ring chamber.

10. The drive unit according to claim 8, wherein said pressure chamber is connected with said cylinder chamber by means of a pressure channel.

11. The drive unit according to claim 10, further comprising a two-way valve, the inputs of which are connected with a tear-open channel and said pressure channel, and the output of which is, via an output channel, connected with a clamping chamber confined by a clamping sleeve.

12. The drive unit according to claim 1, wherein a ratio of the surface area between a piston collar face and a ring front face of a piston of said smaller piston unit is substantially equal to a ratio of the surface area between a bottom face and a ring front face of a power piston of said larger piston unit.

13. The drive unit according to claim 1, wherein the cylinder is indirectly supported by the movable element of the drive unit.

14. The drive unit according to claim 1, wherein the drive unit is at least one of a group comprising a closing unit, an injection unit, a slider and an ejector of an injection molding machine.

* * * * *